United States Patent
Okishio et al.

(10) Patent No.: US 6,719,628 B2
(45) Date of Patent: Apr. 13, 2004

(54) VIDEO GAME DEVICE, PLAY RESULT DISPLAY METHOD OF VIDEO GAME, AND READABLE RECORDING MEDIUM WHERE PLAY RESULT DISPLAY METHOD PROGRAM IS RECORDED

(75) Inventors: Toyomu Okishio, Ibaraki (JP); Hiroshi Tanibuchi, Nishinomiya (JP); Akira Toyama, Suita (JP); Mitsuo Nagamoto, Osaka (JP)

(73) Assignee: KCEO Inc., Osaka (JP)

( * ) Notice: Subject to any disclaimer, the term of this patent is extended or adjusted under 35 U.S.C. 154(b) by 0 days.

(21) Appl. No.: 09/834,258

(22) Filed: Apr. 12, 2001

(65) Prior Publication Data

US 2001/0044333 A1 Nov. 22, 2001

(30) Foreign Application Priority Data

Apr. 14, 2000 (JP) ........................................ 2000-113933

(51) Int. Cl.[7] ................................................ A63F 13/00
(52) U.S. Cl. .............................. 463/3; 463/30; 463/43
(58) Field of Search ................................ 463/1–4, 7–8, 463/23, 30–33, 35, 40–42, 43–44; 273/317.1–317.6, 108.3

(56) References Cited

U.S. PATENT DOCUMENTS

| | | | | |
|---|---|---|---|---|
| 5,435,554 A | * | 7/1995 | Lipson | 463/3 |
| 5,601,487 A | * | 2/1997 | Oshima et al. | 463/31 |
| 6,120,374 A | * | 9/2000 | Akada et al. | 463/3 |
| 6,270,402 B1 | * | 8/2001 | Fujioka et al. | 463/2 |
| 6,342,008 B1 | * | 1/2002 | Toyohara et al. | 463/23 |
| 6,368,210 B1 | * | 4/2002 | Toyohara et al. | 463/3 |
| 6,394,894 B1 | * | 5/2002 | Okitsu et al. | 463/3 |
| 6,394,895 B1 | * | 5/2002 | Mino | 273/139 |

FOREIGN PATENT DOCUMENTS

| | | | | |
|---|---|---|---|---|
| EP | 823271 A1 | * | 2/1998 | A63F/9/22 |
| JP | 09182875 A | * | 7/1997 | A63F/9/22 |
| JP | 03052740 | * | 7/1998 | A63B/71/06 |
| JP | 10314361 | | 12/1998 | |
| JP | 1998314361 A | * | 12/1998 | A63B/71/06 |

* cited by examiner

Primary Examiner—Teresa Walberg
Assistant Examiner—Scott E. Jones
(74) Attorney, Agent, or Firm—Jordan and Hamburg LLP

(57) ABSTRACT

A video game device includes monitor which displays game images, including a pitcher game character that executes a pitching action, a pitching instruction section for instructing a pitching course to the pitcher game character, a pitching storage section for storing the result of a pitch executed based on an instruction from the pitching instruction section for each pitch, a coordinate setting section for setting a two-dimensional coordinate for displaying a pitching course in a predetermined area on a display screen of the monitor, a data conversion section for converting the pitching course data of each pitch to a corresponding position data on the coordinate based on the pitching result read from the pitching storage section, and a mark display section for displaying a mark on the converted position on the coordinate.

7 Claims, 9 Drawing Sheets

VIDEO GAME DEVICE, PLAY RESULT DISPLAY METHOD OF VIDEO GAME, AND READABLE RECORDING MEDIUM WHERE PLAY RESULT DISPLAY METHOD PROGRAM IS RECORDED

BACKGROUND OF THE INVENTION

1. Field of the Invention

The present invention relates to a video game device which allows a play character on the video screen to have a pseudo-experience (role playing) instead of a game player, a play result display method display method of the video game, and a readable recording medium where the method thereof is recorded.

2. Description of the Related Art

When a game content of a role playing game, where the game player has a pseudo-experience as a play character on the video screen, is a baseball game, a game equipping a pitching record display screen for displaying the pitching record of a pitcher of a baseball game is well known. On the pitching record display screen, a pitch is classified depending on the pitch type and the pitching data on the number of balls a pitcher pitched in a game depending on the pitch type, and other information is displayed, so that the game player can know the tendency of the pitching of a pitch of his own team or the other team by checking this pitching record display screen.

In this case, to indicate a course of a pitch, a predetermined pitching zone is divided into a predetermined number of sub-zones, and the number of balls pitched into each sub-zone is displayed as a number.

In the case of the method of displaying the pitching course, however, only the number of balls pitched into each sub-zone is displayed as a number, so the game player cannot know the detailed course of each pitch. Therefore, a conventional baseball game requires an improvement of amusement in terms of the analysis of a pitching result.

SUMMARY OF THE INVENTION

With the foregoing in view, it is an object of the present invention to provide a video game device which can improve amusement in terms of the analysis of a pitching result, a play result display method of the video game, and a readable recording medium where the play result display method is recorded.

The first aspect of the invention regards to a video game device comprising a monitor which can display game images, including a pitcher game character that executes a pitching action, an instruction element for instructing a pitching course to the pitcher game character, pitching result storage means for storing the result of pitches executed based on an instruction from the instruction element for each pitch, coordinate setting means for setting a two-dimensional coordinate for displaying a pitching course in a predetermined area on a display screen of the monitor, conversion means for converting the a pitching course data of each pitch to a corresponding position data on the coordinate based on the pitching result read from the pitching result storage means, and mark display means for displaying a mark on the converted position on the monitor.

The second aspect of the invention is a play control method of a video game, comprising a step of storing a result of pitching executed based on an instruction to a pitcher game character that executes a pitching action displayed on a monitor for each pitch, a step of setting a two-dimensional coordinate for displaying a pitching course in a predetermined area of a display screen of the monitor, a step of converting a pitching course data of each pitch to a corresponding position data on the coordinate based on the read pitching result, and a step of displaying a mark on the converted position on the monitor.

The third aspect of the invention is a readable recording medium where a play control method program for a video game is recorded, comprising a step of storing a result of pitching executed based on an instruction to a pitcher game character that executes a pitching action displayed on a monitor for each pitch, a step of setting a two-dimensional coordinate for displaying a pitching course in a predetermined area on a display screen of the monitor, a step of converting a pitching course data of each pitch to corresponding position data on the coordinate based on the read pitching result, and a step of displaying a mark on the converted position on the monitor.

According to another aspect of the inventions with respect to the above aspects, when a pitching content is instructed to the pitcher game character on the monitor that executes a pitching action, the pitcher game character pitches based on that instruction content. The result of each pitch during a game is stored for each pitch, and the pitching result is displayed on the monitor when the game is over. In this case, the two-dimensional coordinate for displaying a pitching course is displayed in a predetermined area on the display screen of the monitor, the pitching course data of each pitch is substituted with the corresponding position data on the coordinate based on the read pitching result, and a mark is displayed at the converted position on the monitor.

Since a two-dimensional coordinate is set in a predetermined area on the display screen of the monitor and the pitching course is displayed on this coordinate, more detailed pitching course data can be provided to the player compared with a conventional display format. As a result, amusement in terms of the analysis of a pitching result is improved compared with a conventional baseball game.

DESCRIPTION OF THE PREFERRED EMBODIMENTS

Figure 1:
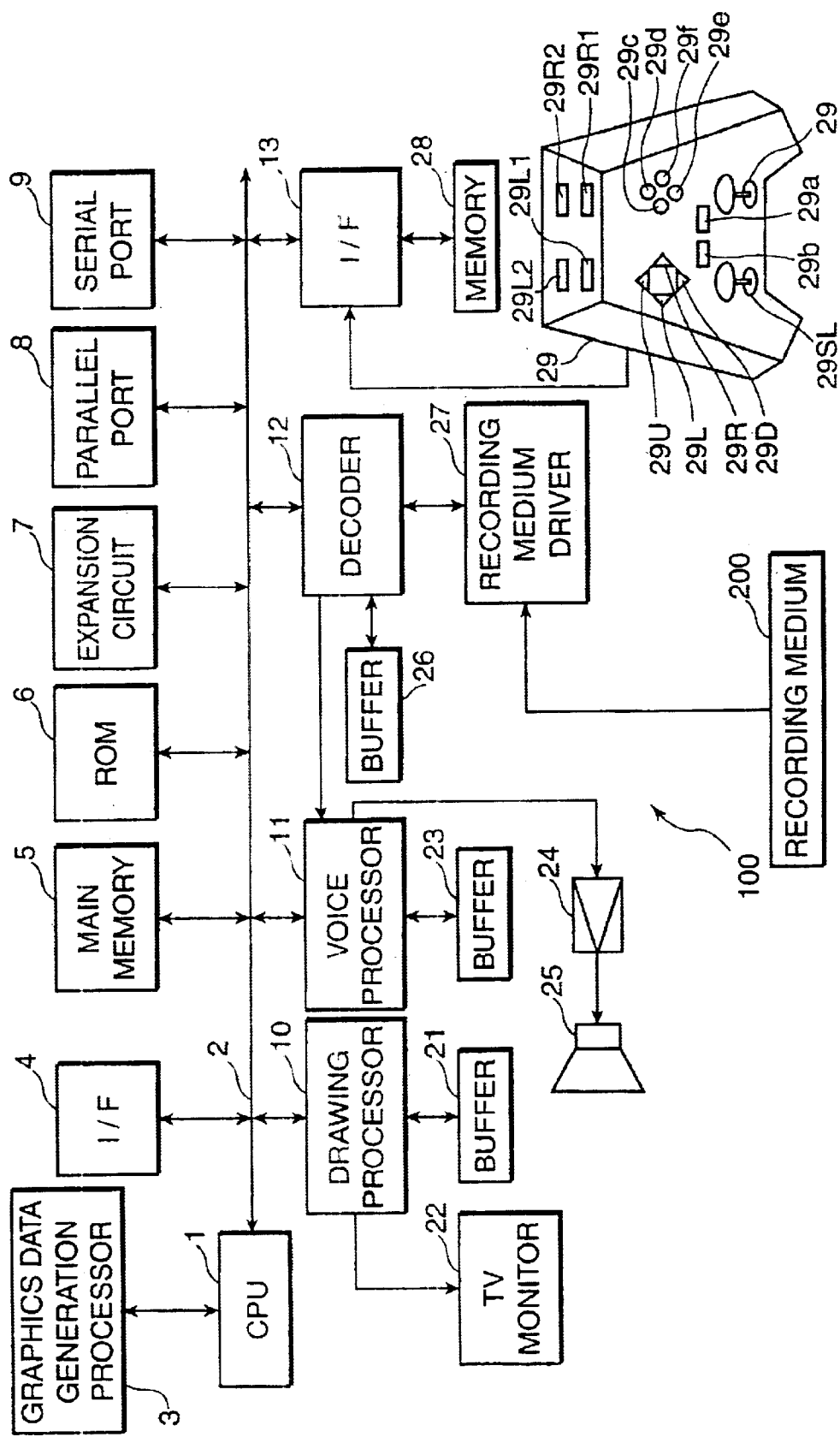
FIG. 1 is a section diagram depicting a game system of an embodiment of the present invention.

FIG. 1 is a section diagram depicting an electric configuration of a game system, which is an embodiment of the video game device according to the present invention.

This game system comprises a game device main body 100 and a recording medium 200 where program data is recorded. The game device main body 100 comprises a CPU 1, a bus line 2 further comprising an address bus, a data bus and a control bus, and a graphics data generation processor 3, which are connected to the CPU 1, and each component is connected to the bus line 2.

An interface circuit 4, a main memory 5 comprised of RAM, ROM 6, an expansion circuit 7, a parallel port 8, a serial port 9, a drawing processor 10, a voice processor 11, a decoder 12 and an interface circuit 13 are connected to the bus line 2.

A buffer 21 and a TV monitor (hereafter monitor) are connected to the drawing processor 10, a buffer 23 and a speaker 25 are connected, via the amplification circuit 24, to the voice processor 11, a buffer 26 and a recording medium driver 27 are connected to the decoder 12, and a memory 28 and a controller 29 are connected to the interface circuit 13.

The configuration of this game system is different depending on the intended use. For example, when this game system is configured for home use, the monitor 22 and the speaker 25 are separate from the game device main body 100. And when this game system is configured for business use, all components in FIG. 1 are integrated and stored in one body.

When this game device is configured with a personal computer or a workstation as the core, the monitor 22 corresponds to the display for the computer, the drawing processor 10, voice processor 11 and expansion circuit 7 correspond to a part of the program data recorded in the recording medium 200 or hardware on the expansion board mounted in the expansion slot of the computer respectively, and the interface circuit 4, parallel port 8, serial port 9 and interface circuit 13 correspond to hardware on the expansion board mounted in the expansion slot of the computer. The buffers 21, 23 and 26 correspond to each area of the main memory 5 or the expanded memory (not illustrated) respectively.

In this embodiment, a case when this game system is configured for home use will be described as an example.

Each component in FIG. 1 will now be described. The graphics data generation processor 3 plays a role as a coprocessor of the CPU 1. In other words, this graphics data generation processor 3 executes coordinate transformation and light source calculation, such as the computing of fixed point matrixes and vectors, by parallel processing. The major processing executed by the graphics data generation processor 3 includes processing for determining an address of the processing target image on the display area based on the coordinate data of each vertex in a two-dimensional or three-dimensional space of the image data, moving amount data and rotation amount data, which are supplied from the CPU 1, and returning this address data to the CPU 1, and processing for calculating the luminance of the image according to the distance from the virtually set light source.

The interface circuit 4 is for peripheral devices, including a pointing device, such as a mouse and trackball. In ROM 6, program data, such as an operating system of the game system, is stored. In the personal computer, the ROM 6 corresponds to BIOS (Basic Input Output System).

The expansion circuit 7 executes expansion processing on compressed images compressed by intra-coding conforming to MPEG (Moving Picture Engineering Group) for moving pictures, and JPEG (Joint Picture Engineering Group) for still pictures. Expansion processing includes decoding processing (Decoding of data encoded by VLC: Variable Length Code), inverse quantization processing, IDCT (Inverse Discrete Cosine Transform) processing, and restoring processing of intra-images.

The drawing processor 10 executes drawing processing for the buffer 21 based on the drawing instruction issued by the CPU 1 at each predetermined time T (one frame, e.g. T=1/60 seconds).

The buffer 21 is comprised of RAM, for example, which further comprises a display area (frame buffer) and a non-display area. The display area is an expansion area of data to be displayed on the display screen of the monitor 22.

In the present embodiment, the non-display area is a storage area for data to define skeletons, model data to define polygons, animation data to move models, pattern data to indicate the content of each animation, texture data, and color pallet data.

Here texture data is two-dimensional image data. The color pallet data is data for specifying colors of texture data. This data is recorded from the recording medium 200 to the non-display area of the buffer 21 in advance by the CPU 1 all at once or a plurality of times according to the progress status of the game.

Drawing instructions include drawing instructions for drawing three-dimensional images using polygons and drawing instructions for drawing regular two-dimensional images. Here a polygon is a two-dimensional virtual graphic of a polygon, and triangles are used for this embodiment.

A drawing instruction for drawing a three-dimensional image using polygons is comprised of polygon vertex address data on the display area of the buffer 21, texture address data to indicate a storage position on the buffer 21 of the texture data to be pasted onto the polygons, color pallet address data to indicate a storage position on the buffer 21 of the color pallet data for indicating the color of texture data, and luminance data to indicate the luminance of texture.

Of this data, the polygon vertex address data on the display area is substituted with the two-dimensional polygon vertex coordinate data when the graphics data generation processor 3 executes coordinate transformation on the polygon vertex coordinate data in a three-dimensional space from the CPU 1, based on the moving amount data and the rotation amount data of the screen itself. Luminance data is determined by the graphics data generation processor 3 based on the distance between the position indicated by polygon vertex coordinate data after the above mentioned coordinate transformation from the CPU 1 and the virtually disposed light source.

Polygon vertex address data indicates an address on the display area of the buffer 21, and the drawing processor 10 executes processing to write texture data corresponding to the range of the display area of the buffer 21 indicated by three polygon vertex address data.

One object is comprised of many polygons. The CPU 1 stores the coordinate data of each polygon in the three-dimensional space in the buffer 21, associating with the vector data of the corresponding skeleton. To move a character on the display screen by an operation of the controller 29, that is, to express movement of a character, or to change the view point position to observe the character, the following processing is executed.

The CPU 1 sends the three-dimensional coordinate data of the vertex of each polygon held in the non-display area of the buffer 21, and the moving amount data and the rotation amount data of each polygon determined from the coordinates of the skeleton and the data on the rotation amount thereof, to the graphics data generation processor 3.

The graphics data generation processor 3 sequentially determines the three-dimensional coordinate data after moving and the rotation of each polygon based on the three-dimensional coordinate data of the vertex of each polygon and the moving amount data and the rotation amount data of each polygon.

Of the three-dimensional coordinate data of each polygon determined in this way, the coordinate data in the horizontal and vertical directions is sent to the drawing processor 10 as address data on the display area of the buffer 21, that is, polygon vertex address data.

The drawing processor 10 writes the texture data, which is indicated by the pre-assigned texture address data, to the triangular display area of the buffer 21, which is indicated by three polygon vertex address data. By this, an object comprised of many polygons where texture data is pasted is displayed on the display screen of the monitor 22.

A drawing instruction for drawing a regular two-dimensional image is comprised of vertex address data, texture address data, color pallet address data, which indicates the storage position of the color pallet data to indicate the color of texture data on the buffer 21, and luminance data to indicate the luminance of texture. Of this data, the vertex address data is coordinate data when the graphics data generation processor 3 transforms the vertex coordinate data on a two-dimensional plane from the CPU 1 based on the moving amount data and rotation amount data from the CPU 1.

The voice processor 11 writes the ADPCM data read from the recording medium 200 to the buffer 23, and uses the ADPCM data stored in the buffer 23 as a sound source. The voice processor 11 reads the ADPCM data based on a clock signal at a 44.1 kHz frequency, for example.

The voice processor 11 executes such processing as pitch conversion, adding noise, setting an envelope, setting level and adding reverberation on the ADPCM data used from the buffer 23.

When the voice data read from the recording medium 200 is such PCM data as CD-DA (Compact Disk Digital Audio), the voice processor 11 converts the PCM data to ADPCM data.

Processing on the PCM data based on program data is directly executed on the main memory 5. The PCM data processed on the main memory 5 is sent to the voice processor 11, converted to ADPCM data, then is output from the speaker 25 as voice, after the various above mentioned processings are executed.

The recording medium driver 27 is for a CD-ROM drive, hard disk drive, optical disk drive, flexible disk drive, silicon disk drive, or cassette medium reader, for example.

The recording medium 200 is a CD-ROM, hard disk, optical disk, flexible disk or semiconductor memory, for example.

The recording medium driver 27 reads image, voice and program data from the recording medium 200 and sends the read data to the decoder 12. The decoder 12 executes error correction processing on the regenerated data from the recording medium driver 27 based on ECC (Error Correction Code), and after error correction sends the data to the main memory 5 or to the voice processor 11.

The memory 28 is, for example, comprised of a holder or card type memory. The card type memory is for retaining various parameters of the game used to maintain status in the middle of a game at an interruption, for example.

The controller 29, which is an operation means which can be operated from the outside, comprises a first left button 29L1, second left button 29L2, first right button 29R1, second right button 29R2, up direction key 29U, down direction key 29D, left direction key 29L, right direction key 29R, start button 29a, select button 29b, first button 29c, second button 29d, third button 29e, fourth button 29f, left stick 29SL and right stick 29SR, so as to send an operation signal according to the operation of the player to the CPU 1.

The up direction key 29U, down direction key 29D, left direction key 29L and right direction key 29R are for the player to send a command to the CPU 1 to move the character or cursor vertically and horizontally, for example, on the screen of the monitor 22.

The start button 29a is for the player to instruct the CPU 1 to start the game program data which is loaded from the recording medium 200. The select button 29b is for the player to instruct the CPU 1 to make various selections on the game program data which is loaded from the recording medium 200 to the main memory 5.

Each button and key on the controller 29, except for the left stick 29SL and the right stick 29SR, is an ON/OFF switch which turns ON if pressed down from the neutral position by a pushing pressure from the outside, and returns to the neutral position and turns OFF if the pushing pressure is released.

The left stick 29SL and the right stick 29SR are stick type controllers having a configuration generally the same as a joy stick. In other words, the left stick 29SL/right stick 29SR has an upright stick which can be tilted in a 360 degree direction, including to the front, back, left and right, with a predetermined position of the stick as a fulcrum. And according to the tilting direction and tilt angle of the stick, the values of the x coordinate in the left and right directions and the y coordinate in the front and back directions, with the upright position as the origin, are sent to the CPU 1 as operation signals via the interface circuit 13.

The functions of the first left button 29L1, second left button 29L2, first right button 29R1 and second right button 29R2 differ depending on the game program data loaded from the recording medium 200.

Now the general operation of this game system will be described. When the power supply switch (not illustrated) is turned ON, power is supplied to the game system. If the recording medium 200 is set in the recording medium driver 27 at this time, the CPU 1 instructs the recording medium driver 27 to read the program data from the recording medium 200 based on the operating system stored in the ROM 6. By this, the recording medium driver 27 reads image, voice and program data from the recording medium 200. The read image, voice and program data are supplied to the decoder 12 where error correction processing is executed.

Image data, for which error correction processing is executed in the decoder 12, is supplied to the expansion circuit 7 via the bus line 2, and after the above mentioned expansion processing is executed, the image data is supplied to the drawing processor 10, and is written to the non-display area of the buffer 21 by the drawing processor 10.

Voice data, for which error correction processing is executed in the decoder 12, is either written to the main memory 5 or is supplied to the voice processor 11, and is written to the buffer 23.

Program data, for which error correction processing is executed in the decoder 12, is written to the main memory 5. Hereafter, the CPU 1 progresses the game based on the game program data stored in the main memory 5 and the content of the instruction which the player instructs via the controller 29. In other words, the CPU 1 controls image processing, voice processing and internal processing based on the instruction content which the player instructs via the controller 29.

In the present embodiment, calculation of each skeleton, calculation of vertex coordinate data of polygons, supplying of obtained three-dimensional coordinate data and view point position data to the graphics data generation processor 3, and issuing drawing instructions, including address data and luminance data on the display area of the buffer 21 determined by the graphics data generation processor 3, are executed as a control of image processing based on the pattern data corresponding to the animation instructed to the character, for example. As a control of voice processing, issuing of a voice output command to the voice processor 1, and specifications of level and reverberation are executed, for example. As a control of internal processing, operation according to the control of the controller 29 is executed, for example.

Now an overview of a video game to be executed by the game program recorded in the recording medium 5 will be presented.

In this video game, the hero, a professional baseball player (play character) that appears as a pitcher or batter according to the operation of the controller 16 by the player, and the pitching result and batting result, are displayed after play is over.

Players that will participate as starting members in pennant or league mode are not illustrated here, but are registered as players. When at bat, a starting member is a batter waiting for a pitch from the pitcher of the other team. Or the player is on base as a runner. The position of the catcher's mitt at this time is displayed at an appropriate position on the screen. If a runner is on base, the runner is displayed at the upper left/right of the display. A batter does not swing if it is judged that a pitched ball will not enter the expected zone, and if a strong swing is taken or if the bat contacts the ball it is judged that the pitched ball comes into the expected zone.

When fielding, a player takes the mound as a pitcher and pitches to a batter from the other team. Or players are stationed at respective defense positions.

The batting result is generally recorded with abbreviations by the field position and batting result. Such records as RH (hit to the right) and SG (short grounder) are determined by combining the position of the field that fielded the ball and the batting result. When no fielder is related to the ball, as in the case of a home run, the direction of the hit ball is combined, as in RHR (right home run). There is a special recording as Sb/F (sacrifice bunt and fielder's choice) and there are examples below where an abbreviation is shown before ":", and the meaning thereof after ":".

(Field Position)

| P: pitcher | Ca: catcher | 1: first |
| 2: second | 3: third | s: shortstop |
| L: left | C: center | R: right |

(Batting Result)

| H: base hit | 2: two base hit |
| 3: three base hit | HR: homerun |
| Sb: sacrifice bunt | Sq: squeeze bunt |
| Sf: sacrifice fly | G: grounder |
| D: double play | F: fly |
| FF: foul fly | L: liner |
| FC: fielder's choice | E: error |

(Special Batting Records)

RH: running homerun

W: walk D: dead ball So/F: struck out but reached first when catcher let ball get away IW: intentional walk Sb/F: sacrifice bunt and fielder's choice overlap (including squeeze bunt)

Sb/E: sacrifice bunt and error overlap (including squeeze bunt)

SO: struck out letting pitch go by

SS: struck out swinging

Sf/E: sacrifice fly and error overlap

The pitching result is recorded according to the pitcher, pitch type and hit result. There are seventeen pitching types: straight, slow ball, H. slider, slider, slow curve, S. slow curve, curve, changeup, fork ball, knuckle ball, V. slider, palm ball, SFF (split finger fast ball), screwball, H. sinker, sinker and screwball (shoot), and in the game system, one pitcher can throw seven types of pitches, that is, straight, slow ball, screwball (shoot), one of changeup, fork ball, knuckle ball, V. slider, palm ball and SFF, one of screw ball, H. sinker and sinker, one of H. slider and slider, and one of slow curve, S. slow curve and curve.

Figure 2:
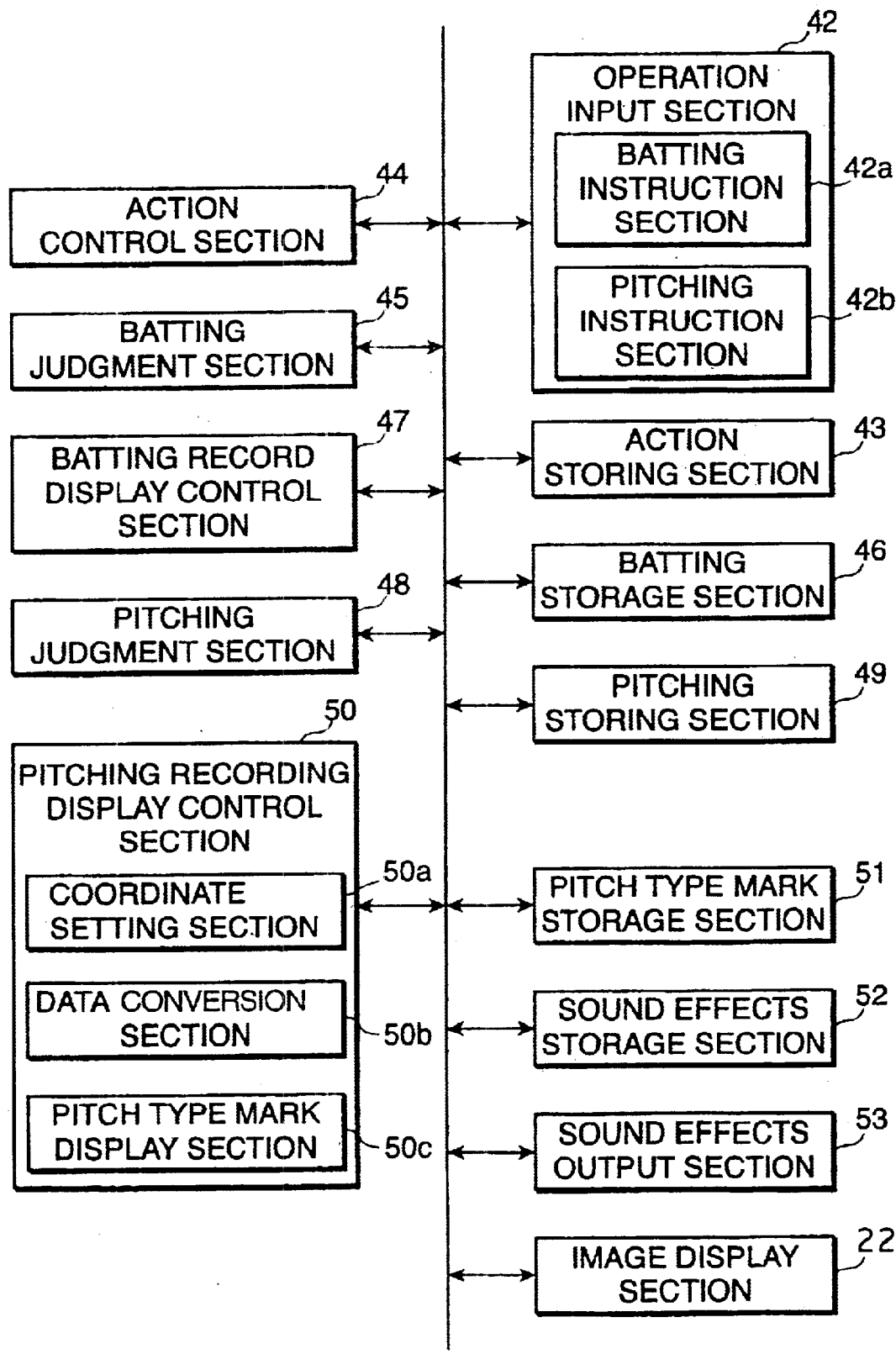
FIG. 2 is a functional section diagram depicting the major components of this game device.

FIG. 2 is a functional section diagram depicting the major components in FIG. 1.

As FIG. 2 shows, the video game device according to this embodiment (hereafter this game device) comprises an image display section 22 including a TV monitor (hereafter monitor) for displaying the players that are play characters and the action of the game as well as a menu corresponding to each action of the players, an operation input section (operation section) 42 including an operation controller 29 which can selectively instruct a menu for an arbitrary action from the various menus, an action storage section 43 for storing the action information of the players corresponding to the operation content in the operation input section 42, and an action control section 44 for reading the action information according to an instruction from the operation input section 42 from the action storage section 43 and executing the action information.

When the play character is a batter, this game device further comprises a batting instruction section 42*a* for instructing batting operation to this batter, batting judgment section 45 for judging the result of batting operation based on the batting operation instructed by the batting instruction, a batting storage section 46 for storing the batting judgment result as an operation result, and a batting record display control section 47 for reading the batting judgment result from the batting storage section 46 and displaying it on the image display section 22.

When the play character is a pitcher, this game device further comprises a pitching instruction section 42*b* for instructing pitching action to this pitcher, a pitching judgment section 48 for judging the result of pitching action based on the pitching action instructed by the pitching instruction, a pitching storage section 49 for storing the pitching action executed based on the above pitching instruction and pitching operation result judged by the pitching judgment section 48 as an operation result, and pitching record display control section 50 for reading the pitching judgment result from the pitching storage section 49 to the image display section 22 and displaying it on the image display section 22.

The pitching record display control section 50 further comprises a coordinate setting section 50*a* for setting a two-dimensional coordinate at a predetermined position on the display screen of the monitor 22 so as to display a pitching course, a data conversion section 50*b* for converting the pitching course data of each pitch to a corresponding position data on the coordinate based on the pitching result read from the pitching storage section 49, and a pitch type mark display section 50*c* for displaying the later mentioned pitch type mark at a converted position on the coordinate, on the pitching recording screen in the later mentioned "full view mode" and "trace mode".

When the pitching record is displayed on the monitor 22 by the pitching recording display control section 50, this game device further comprises a pitch type mark storage section 51 for storing a pitch type mark corresponding to each pitch type so as to display the pitch type of the pitch, a sound effect storage section 52 for storing the pitch type of each pitch and the sound effect including the pitching sound, catching sound, hitting sound and bat swinging sound, and a sound effect output section 53 for selecting a sound effect according to each pitching status out of a plurality of sound effects stored in the sound effect storage section 52 and outputting the sound effect. The pitch type and pitching sound correspond to each other, and the batting result and catching sound, and batting sound and bat swinging sound correspond to each other. The batting result is processed as the hit result from the pitcher's point of view.

Now the pitching record screen will be described.

In the display format of the pitching record screen, the baseball video game according to the present invention has three types of display formats: "normal mode", "full view mode" and "trace mode".

Figure 3:
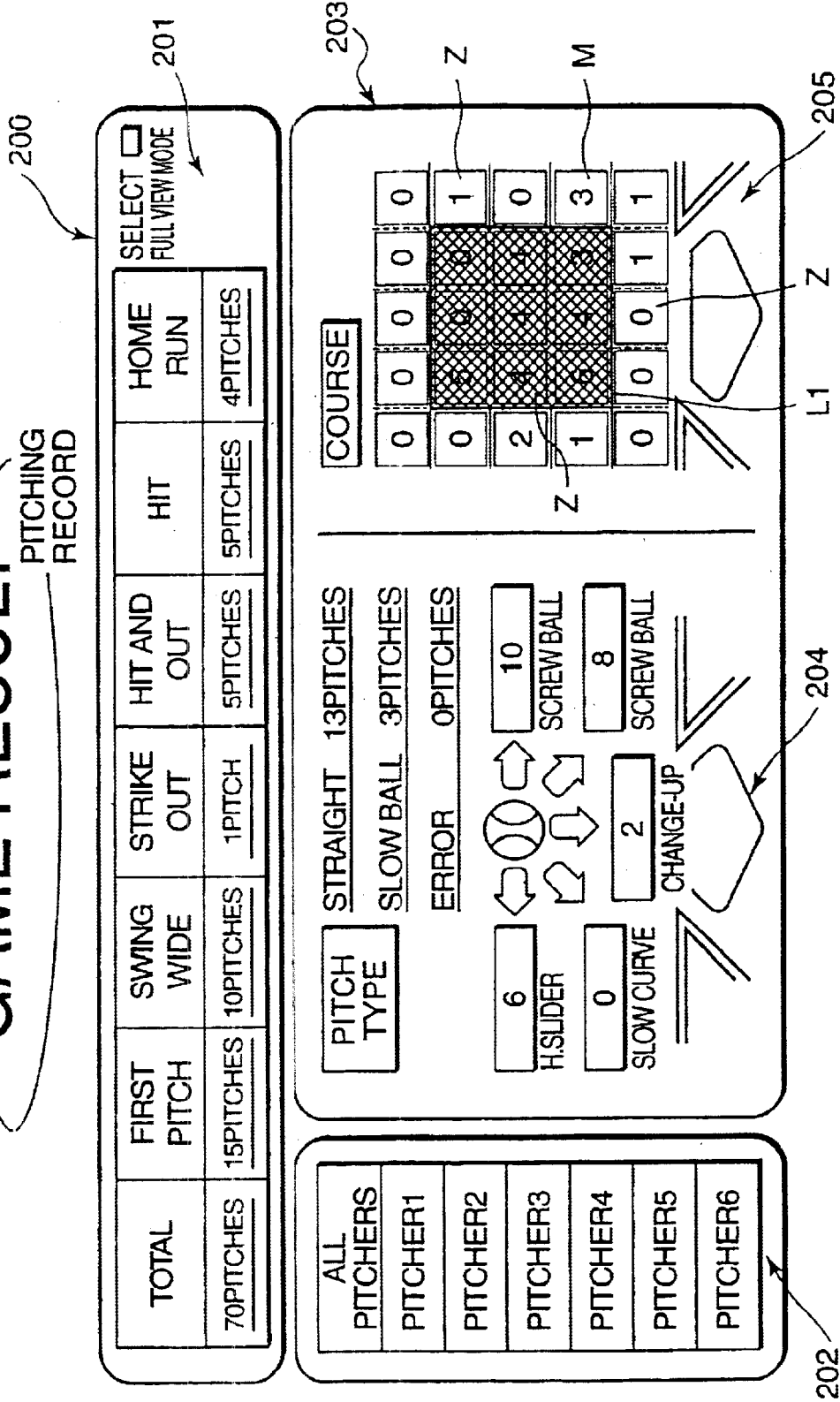
FIG. 3 is a diagram depicting one screen of the video game.
Figure 4:
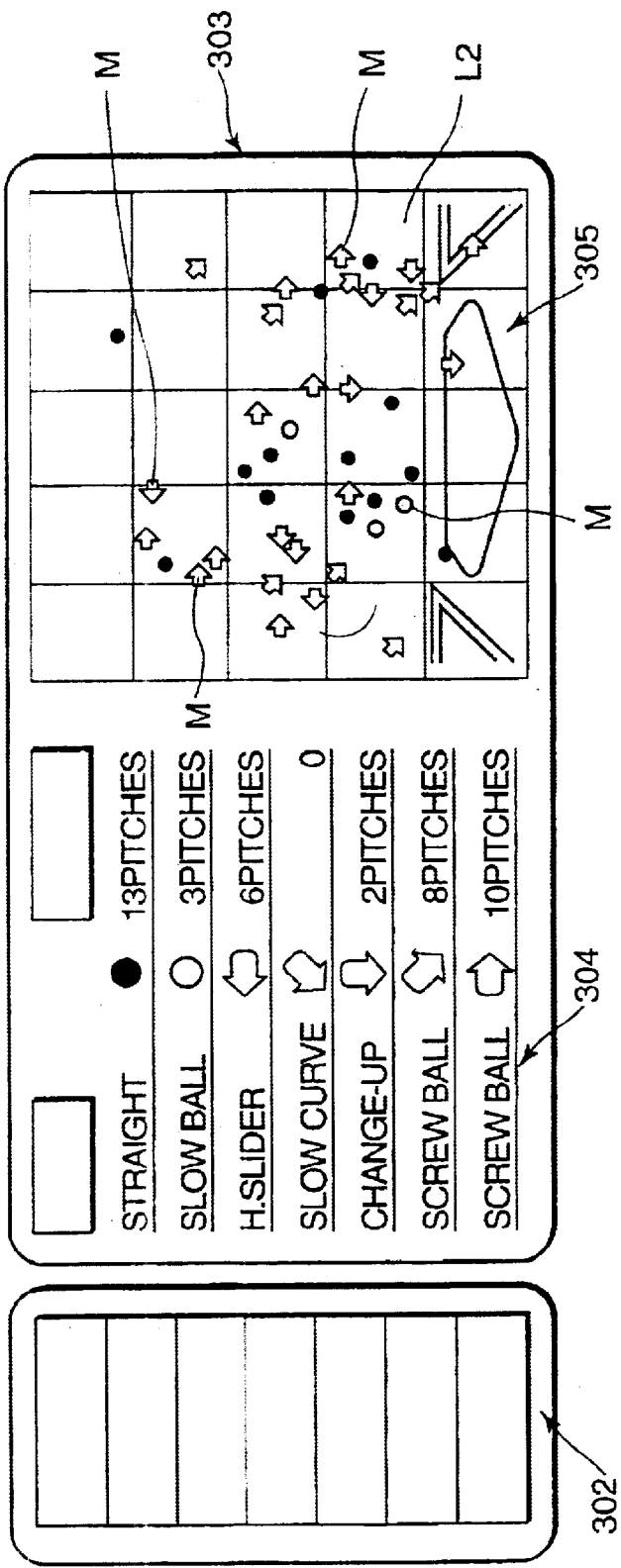
FIG. 4 is a diagram depicting another screen of the video game.
Figure 5:
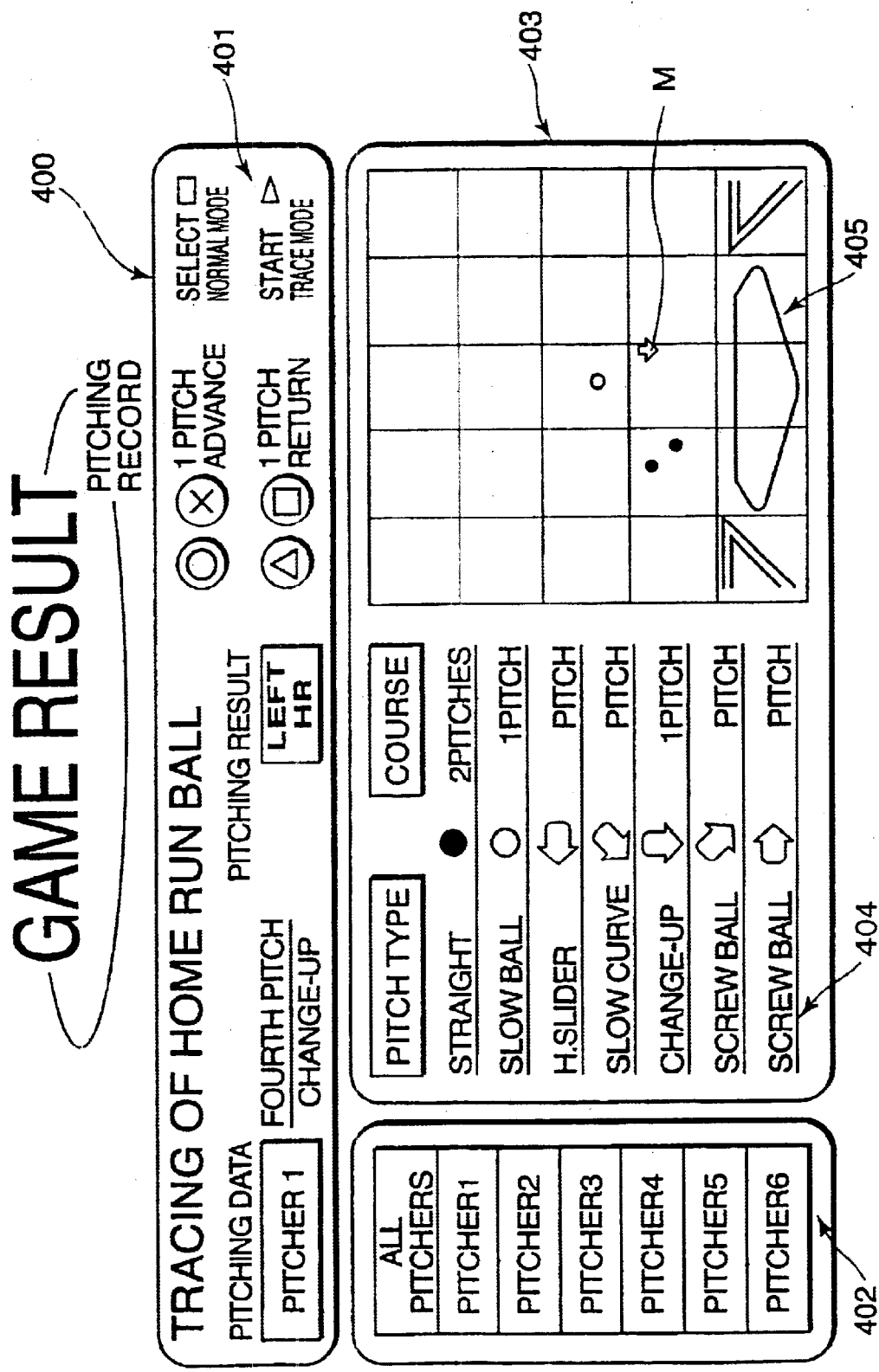
FIG. 5 is a diagram depicting yet another screen of the video game.

FIG. 3 shows the pitching record screen in "normal mode", FIG. 4 shows the pitching record screen in "full view mode", and FIG. 5 shows the pitching record screen in "trace mode".

As FIG. 3 shows, the pitching record screen 200 in "normal mode" comprises a first display section 201 for displaying the number of pitches for each hit result where each pitch is classified by each hit result, a second display section 202 for displaying the names of pitchers that are participating in the game, and a third display section 203 for displaying the number of pitches during the game for each pitch type and pitching course.

In the first display section 201, the total number of balls pitched during a game, the number of first pitches to each batter, the number of pitches to which the batter swung wide, the number of strikeouts, the number of pitches to which the batter hit and was out, the number of pitches which were hit, and the number of home runs during a game are displayed for all pitchers or for each pitcher. The total number of balls pitched during a game and the number of first pitches to each batter are not in the hit result, but are included in the hit result in the following description.

In the second display section 202, the characters "all pitchers" and the names of the pitchers that pitched during a game are displayed as a list.

The third display section 203 has two parts: where the left part is the pitch type-based number of pitches display section 204 for displaying the number of pitches for each pitch type, and the right part is the pitching course display section 205 for displaying the course of pitched balls.

The pitch type-based number of pitches display section 204 displays the number of pitches for each one of the above mentioned seventeen types of pitch types.

In the pitching course display section 205, the pitching zone where the pitcher can pitch is parted into a 5×5 matrix by the parting lines L1, that is, parted into a plurality (25) of sub-zones Z. As FIG. 3 shows, the nine sub-zones at the center side enclosed with the thick sold line L1 in the pitching zone are the strike zone, and the peripheral 16 sub-zones thereof are the ball zone. The strike zone and the ball zone are displayed in a different display format, for example, the strike zone is red and the ball zone is blue. In this "normal mode" screen, the number of balls pitched into each sub-zone Z is displayed by number in each sub-zone Z. The pitching zone where the pitcher can pitch may be parted and displayed by coloring each sub-zone with a different color, for example, rather than parting the pitching zone where the pitcher can pitch with the parting line L1.

In the third display section 203, the pitch type-based number of pitching and the pitching course can be displayed for all pitchers or for each pitcher. For example, if "pitcher 3 (name)" is specified as the pitcher, the number of pitches the "pitcher 3 (name)" threw is displayed for each pitch type in the pitch type-based number of pitches display section 204, and the number of balls pitched into each sub-zone is displayed in the pitching course display section 205.

At the right end of the first display section 201, the "normal mode" screen 200 can be switched to the "full view mode" screen by the operation of the selection button 29*b*.

As FIG. 4 shows, the pitching record screen 300 in "full view mode" has a different display format for the pitching course from the pitching record screen 200 in the "normal mode". In other words, the third display section 303 in the "full view mode" is parted into two, the left and right, just like the "normal mode", and the pitch type-based number of pitches display section 304 is disposed at the left and the pitching course display section 305 at the right, but the two-dimensional coordinate, comprised of 100 (dots) vertically and 100 (dots) horizontally, is set in the pitching course display section 305 by the coordinate setting section 50*a*, and the later mentioned pitch type mark M is displayed at a position corresponding to each pitching course on the coordinate, which is the first characteristic of the present invention.

The above pitch type mark M corresponds to each pitch type, as shown in the pitch type-based number of pitches display section 304, and the above mentioned pitch type mark storage section 51 stores the following marks:

Straight: red circle

Slow ball: white circle

H. slider, slider: arrow pointing left

Slow curve, S. slow curve, curve: arrow pointing lower left

Changeup, fork, knuckle, V. slider, palm, SFF: arrow pointing down

Screw, H. sinker, sinker: arrow pointing lower right

Screw (shoot): arrow pointing right

These marks M are for right handed pitchers, and for left handed pitchers, the direction arrows of H. slider, slider, slow curve, S. slow curve, curve, screw, H. sinker, sinker and screw (shoot) indicate directions which are opposite from the above case of right handed pitchers.

In the pitching record screen 300 in this mode, the pitch type-based number of pitches and the pitching course can be displayed for all pitchers or for each pitcher, and also for each hit result.

In the pitching course display section 305, thin lines L2, to part the area of this display section 305 into 5×5 squares, are displayed, by which when the pitching course is displayed in this display section 305 with a predetermined mark, the game player can know, at first sight, the specific pitching course of each pitch, such as "in course", "out of course", "high" and "low".

Out of the above mentioned 25 squares, nine squares at the center side are the strike zone, and this zone is colored dark blue, for example, contrasting with the peripheral ball zone (16 squares). By displaying the strike zone and the ball zone at the peripheral area thereof by a different display format, the game player can distinguish a strike from a ball at first sight.

At the right end of the first display section 301, the "full view mode" can be switched to the display screen 200 in the above mentioned "normal mode" by the operation of the select button 29a, and can be switched to the later mentioned display screen in the "trace mode" by the operation of the start button 29b.

As FIG. 5 shows, the pitching record screen 400 in the "trace mode" is a screen for regenerating each ball actually pitched during a game on the monitor in the above mentioned pitching course display section 405, and the creation of the screen in this mode is the second characteristic of the present invention. In the pitching course display section 405, a two-dimensional coordinate, similar to the above mentioned "full view mode", is disposed, and each pitch is regenerated on this coordinate. If a pitched ball is a breaking ball in this case, the advancing direction of the ball is changed in the regeneration so as to visually indicate that the ball is a breaking ball. The pitch during regeneration is indicated by a pitch type mark corresponding to that pitch.

Along with the regeneration of the pitching status, a sound effect, such as pitching sound, catching sound, batting sound and bat swinging sound is generated, and for the pitching sound, a different sound effect is generated depending on the pitch type and the speed, so as to provide the feel of a live game.

Each time the regeneration of the pitching status of a pitch ends, the number of pitches is counted in the pitch type-based number of pitches display section 404 in the third display section 403, and the mark M is displayed at a position on the coordinate corresponding to the pitching course of the ball in the pitching course display section 405. A mark M, corresponding to a pitch for which regeneration has ended, is displayed semi-transparent, and a mark corresponding to a pitch during regeneration is displayed opaque respectively, so that a ball during regeneration and a ball after regeneration can be distinguished from each other.

In the pitching record screen 400 in the "trace mode" as well, the pitch type-based number of pitches and the pitching course can be displayed for all pitchers or for each pitcher, and can also be displayed for each hit result. For example, if "pitcher 1 (name)" is specified as the pitcher, and the item "pitch hit to be a homerun" is specified for the "pitcher 1", then the item name is displayed in the first display section 401, the pitch type and the number of pitches of the "pitch hit to be a homerun" for "pitcher 1" are displayed, and "pitch hit to be a homerun" for the "pitcher 1" is regenerated sequentially on the monitor one pitch at a time in the pitching course display section 405. FIG. 5 is a screen when the fourth pitch (changeup) of the "pitcher 1" is regenerated, where the characters LHR (left home run) are displayed as the pitching result, which indicates the fourth pitch of the "pitcher 1" is hit to the left direction, becoming a homerun.

In the pitching record screen 400 in the "trace mode", the pitch to be regenerated can be advanced by one by pressing the first button 29c or the second button 29d once, and the pitching course of the previous pitch can be displayed by pressing the third button 29e or the fourth button 29f once. When the previous pitch is displayed by this operation, the pitching status of the previous pitch is not regenerated as described above, but the already displayed pitch type mark, corresponding to the previous pitch, is changed from semi-transparent to opaque, and the mark flashes, so as to display only the pitching course of the previous pitch.

As described above, in the pitching record screen 200 in the "normal mode", the pitching course display section 205 has a 5×5 matrix of the pitching zone where the pitcher can pitch into, and the number of balls pitched into the square is displayed as a number in each square. In the pitching record screen 300 in the "full view mode", 100 (dots)100×(dots), for example, of the two-dimensional coordinate is set in the above mentioned pitching course display section 305, and the pitching course is displayed on the coordinate as a mark M corresponding to each pitch type. In the pitching record screen 400 in the "trace mode", the pitching status is regenerated one pitch at a time on the two-dimensional coordinate created in the above "full view mode".

Therefore, in the pitching record display screen 300 in the "full view mode", the pitching course is displayed in more detail than the screen 200 in the "normal mode". In the "full view mode", data corresponding to the pitch type data and the pitching course data, which cannot be known in the screen 200 in the "normal mode", can be obtained, and the course of each pitch type can be known. In the screen 400 in the "trace mode", a ball actually pitched during a game is regenerated one at a time. As a result, the pitching result can be analyzed in more detail than a conventional baseball game, and amusement, in terms of the analysis of the pitching result, can be improved.

Now the operation of this game device will be described with reference to the flow charts in FIG. 6 to FIG. 9.

Figure 6:
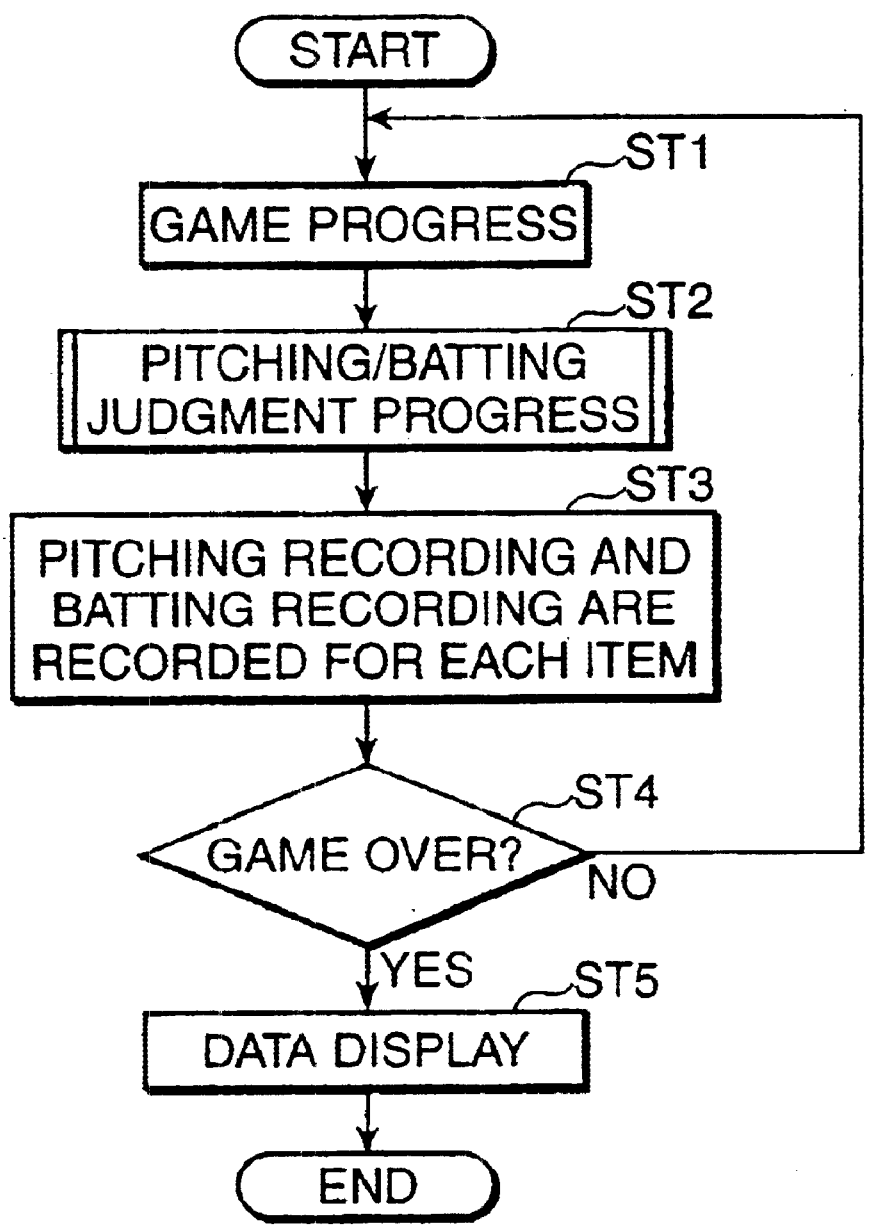
FIG. 6 is a flow chart depicting the general operation of this game device.

In FIG. 6, a plurality of menus are displayed on the video screen, and a desired menu is selected by the operation input section 21, then an action corresponding to this selected menu is executed and the baseball game progresses (Step ST1). If the play character is a pitcher, when a predetermined pitch is instructed to this pitcher by the pitching instruction section 42a, the pitching operation result is judged based on the pitching action instructed by the pitching instruction, and if the play character is a batter, when a predetermined batting instruction is instructed to this batter by the batting instruction section 42b, the batting operation result is judged based on the batting action instructed by the batting instruction (Step ST2).

The pitching judgment result and the batting judgment result are classified into each type, such as each item of the batting record, and are sequentially stored in the pitching storage section 49 and the batting storage section 46 (Step ST3). The results need not be classified into each data at storing, but may be read and then classified. The data need not be sequentially stored, but may be stored in batch.

After judging whether a game is over (Step ST4), the pitching judgment result or the batting judgment result read from the pitching storage section 49 or the batting storage section 46 is displayed by the pitching record display control section 50 or the batting record display control section 47 (Step ST5).

Figure 7:
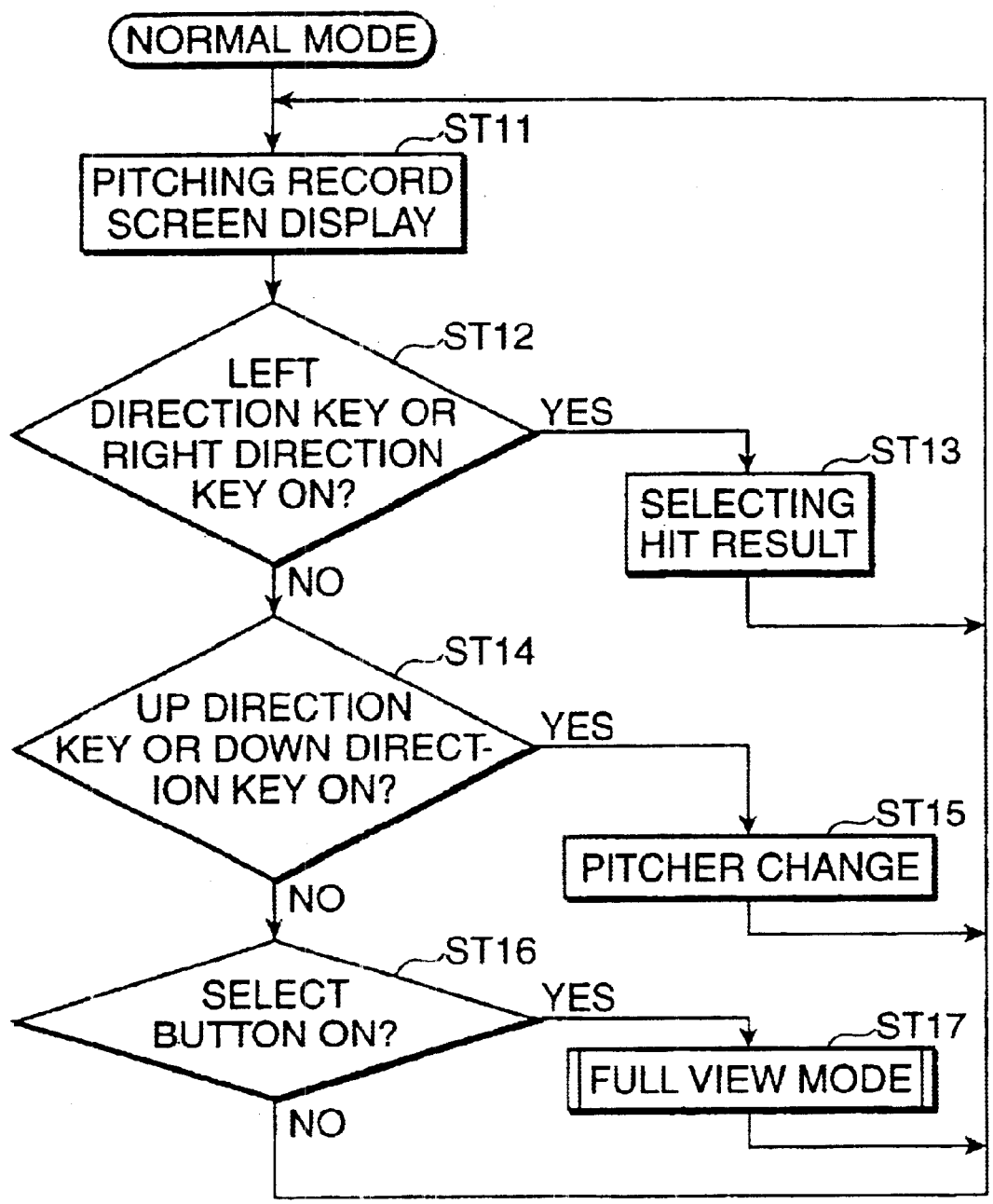
FIG. 7 is a flow chart depicting operation in "normal mode"
Figure 8:
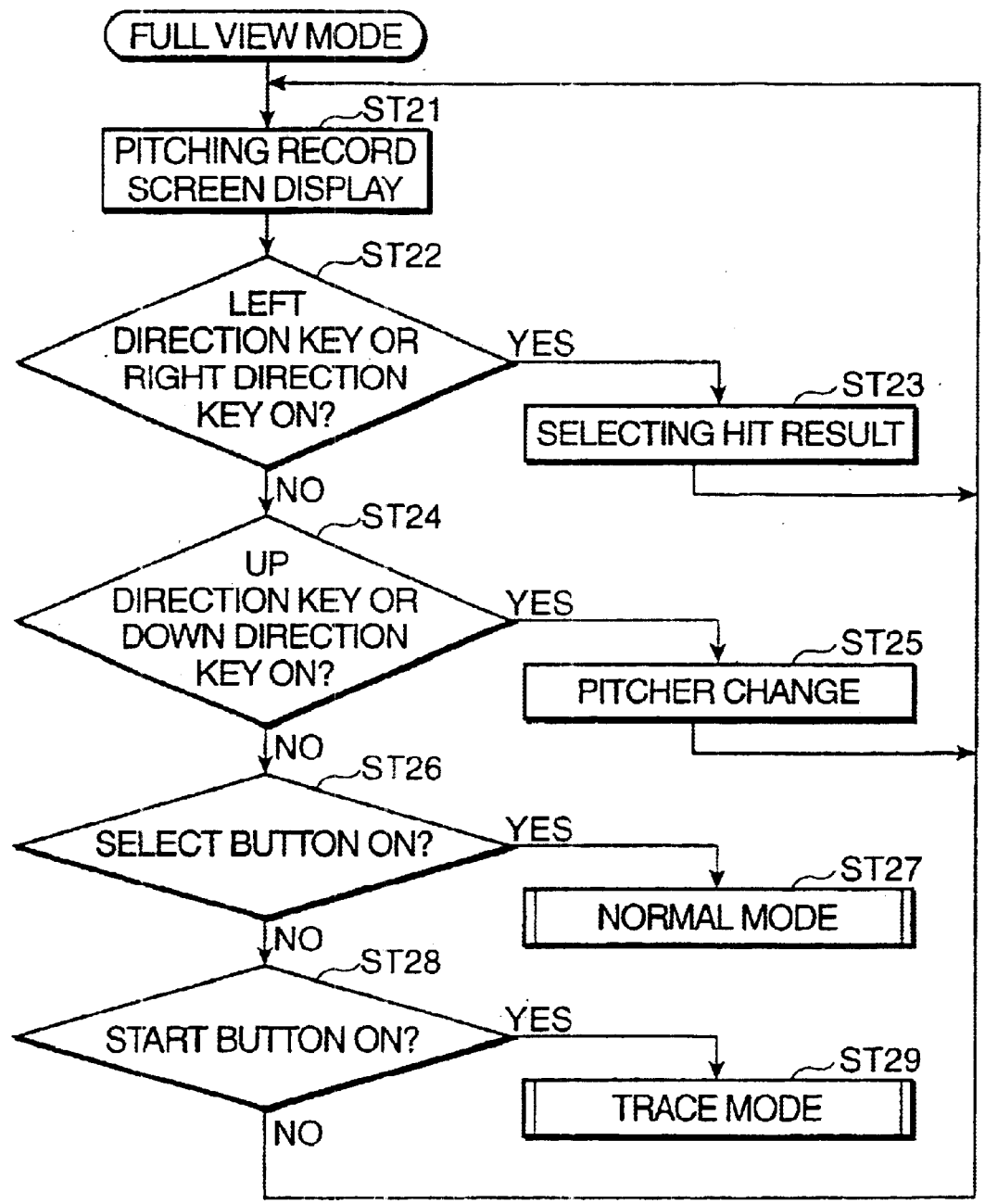
FIG. 8 is a flow chart depicting operation in "full view mode"
Figure 9:
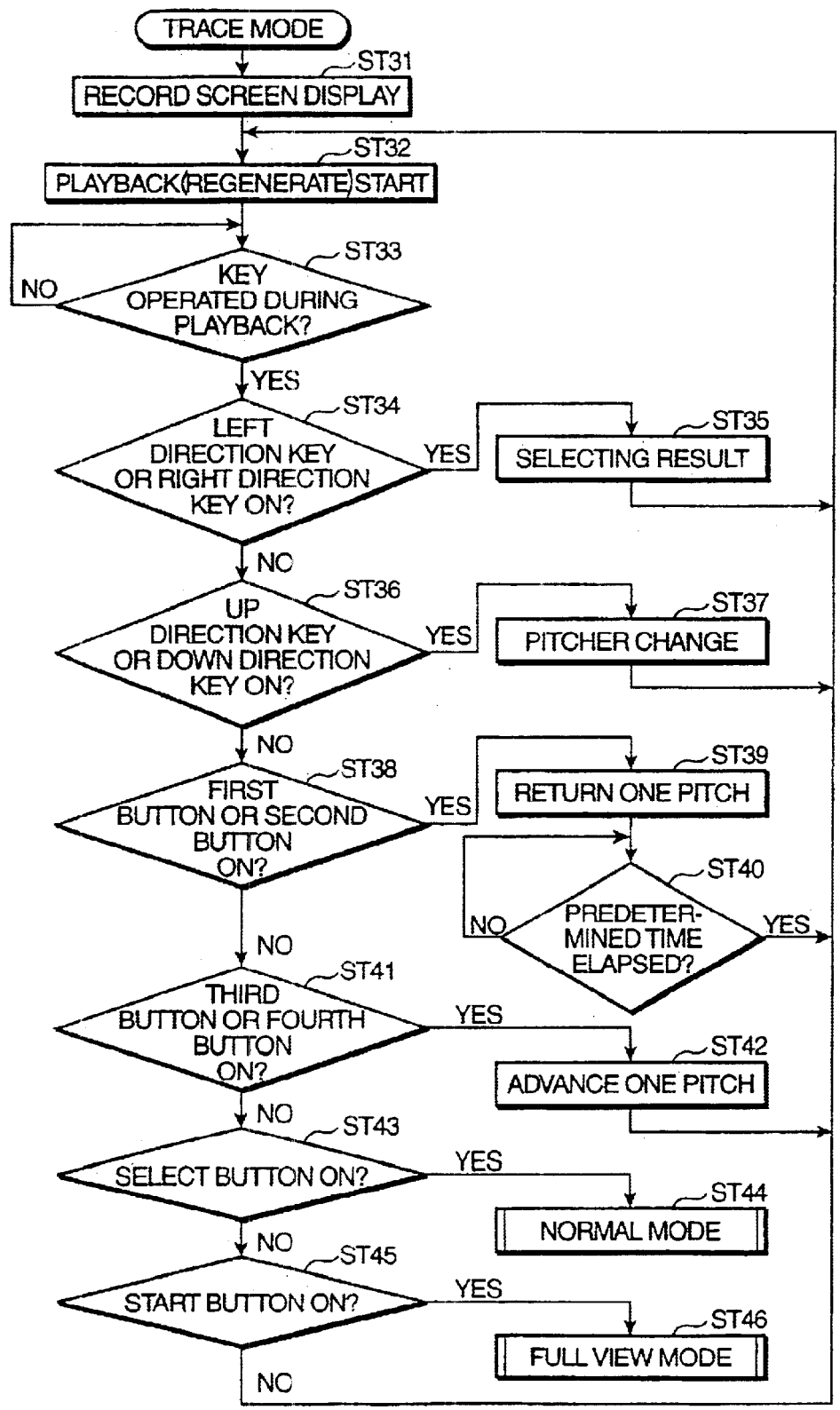
FIG. 9 is a flow chart depicting operation in "trace mode".

Operation of this game device when various buttons of the controller 29 are operated in the pitching record screen in each mode will now be described with reference to the flow charts in FIG. 7 to FIG. 9.

(Normal Mode)

When a baseball game ends, the pitching record screen 200 in the normal mode is displayed (Step ST11). The pitching record screen 200 at this point is a pitching record screen for all pitches of all pitchers, where the number of pitches for each hit result is displayed in the first display section 201, and the number of pitches for each pitch type and the course of each pitch are displayed in the third display section 203.

If the left direction key 29L or the right direction key 29R is pressed in this status (Step ST12), the display content of the third display section 203 switches from the pitch type-based number of pitches and the pitching course for "total" of the hit result to the pitch type-based number of pitches and the pitching course for each hit result (Step ST13).

If the up direction key 29U or the down direction 29D is pressed (Step ST14), the display content of the third display section 203 switches from the pitch type-based number of pitches and the pitching course for all pitchers to the pitch type-based number of pitches and the pitching course for each pitcher (Step ST15). For example, if six pitchers pitched during one game, the display content switches to the sequence of pitcher 1 (name, same for below), pitcher 2, pitcher 3, pitcher 4, pitcher 5 and pitcher 6, each time the up direction key 29U or the down direction key 29D is pressed.

If the select button 29b is pressed (Step ST16), the pitching record screen switches from the screen 200 in normal mode to the screen 300 in the full view-mode (Step ST17).

(Full View Mode)

If the select button 29b is pressed in the "normal mode", the pitching record screen in the full view mode is displayed (Step ST21). The pitching record screen at this point is a pitching record screen for all pitches of all pitchers, just like the case of the normal mode, where the number of pitches for each hit result is displayed in the first display section 301 and the number of pitches for each pitch type and the course of each pitch are displayed in the third display section 303.

If the left direction key 29L or the right direction key 29R is pressed in this status (Step ST22), the display content of the third display section 303 switches from the pitch type-based number of pitches and the pitching course for "total" of the hit result to the pitch type-based number of pitches and the pitching course for each hit result (Step ST23).

If the up direction key 29U or the down direction key 29D is pressed (Step ST24), the display content of the third display section 303 switches from the pitch type-based number of pitches and the pitching course for all pitchers to the pitch type-based number of pitches and the pitching course for each pitcher (Step ST25).

If the select button is pressed (Step ST26), the pitching record screen switches from the screen 300 in the full view mode to the screen 200 in the normal mode (Step ST27).

If the start button 29b is pressed without pressing the select button 29b in the Step ST26 (Step ST28), the pitching record screen switches from the screen 300 in the full view mode to the screen 400 in the trace mode (Step ST29).

(Trace Mode)

If the start button 29a is pressed in the "full view mode", the pitching record in the trace mode is displayed (Step ST31). In the pitching record screen at this point, if marks M are displayed in the screen 300 in the "full view mode", these marks M are all deleted, and all pitches of all pitchers are regenerated one at a time in the sequence of actual pitching (Step ST32). In this case, if the pitch is a breaking ball, the advancing direction of the ball is changed in the regeneration.

When regeneration is over, the mark corresponding to the pitch is displayed semi-transparent, where if a ball is hit by a bat the batting sound is output, and if a ball is not hit by a bat the catching sound is output. Then the next pitch is regenerated in the pitching course display section 405.

If a predetermined button on the controller 29 is operated (Step ST33) during such a regeneration of the pitching status, the following processing is executed.

If the left direction key 29L or the right direction key 29R is pressed (Step ST34), the display content of the third display section 403 switches from the pitch type-based number of pitches and the pitching course for "total" of the hit result to the pitch type-based number of pitches and the pitching course for each hit result (Step ST35).

If the up direction key 29U or the down direction key 29D is pressed (Step ST36), the display content of the third display section 403 switches from the pitch type-based number of pitches and the pitching course for all pitchers to the pitch type-based number of pitches and the pitching course for each pitcher (Step ST37).

If the first button 29c or the second button 29d is pressed once (Step ST38), the mark corresponding to the previous pitch flashes in the pitching course display section 405 (Step ST39). At this time, at the same time as pressing the button 29e or 29f, a predetermined cancellation sound is output to notify the course of the previous pitch. After a predetermined time elapses after this display (Step ST40), the next pitch is regenerated.

If the third button 29e or the fourth button 29f is pressed once (Step ST41), a pitch to be regenerated is advanced one ball (Step ST42).

If the select button 29b is pressed (Step ST43), the pitching record screen switches from the screen 400 in the trace mode to the screen 200 in the normal mode (Step ST44).

If the select button 29b is not pressed in Step ST43 and the start button 29a is pressed (Step ST45), the pitching record screen switches from the screen 400 in the trace mode to the screen 300 in the full view mode (Step ST42).

Therefore, in the pitching record display screen 300 in the "full view mode", the pitching course is displayed in more detail than the screen 200 in the "normal mode", and in the "full view mode", data corresponding to the pitch type data and the pitching course data, which cannot be known in the screen 200 in the "normal mode", can be obtained, and the course of each pitch type can be known, and also in the screen 400 in the "trace mode", a ball actually pitched during a game is regenerated one at a time, so the pitching result can be analyzed in more detail than a conventional baseball game, and amusement, in terms of the analysis of the pitching result, can be improved.

In the pitching course display section 305, thin lines L2 to part the area of this display section 305 into 5×5 squares are displayed, by which when the pitching course is displayed in this display section 305 with a predetermined mark, the game-player can know, at first sight, the specific pitching course of each pitch, such as "in course", "out of course", "high" and "low".

In the screen 400 in the "trace mode", the strike zone and the ball zone at a peripheral area thereof in the pitching course display section 403 are displayed by a different display format, so the game player can distinguish a strike from a ball at first sight.

And each pitch is classified by the pitcher that pitched the ball, and the ball when each pitcher is pitching is regenerated on the monitor 22 in the screen 400 in the "trace mode", so the above mentioned amusement can be further improved.

Also each pitch is classified by the hit result of the pitch, and a ball in the hit result when each pitcher is pitching can be regenerated on the monitor 22 in the screen 400 in the "trace mode", so the above mentioned amusement can be further improved, just like above.

Also in the "trace mode", such sound effects as the pitching sound and the catching sound is output, so when the pitching result is seen on the screen of the monitor 22, the feeling of a live game can be reproduced.

On the above mentioned three types of record screens in each mode, the pitching record screen of the other team may be displayed by operating a predetermined button.

For the above mentioned each pitch type mark, the color of the mark may be changed depending on the pitch type, so as to distinguish each pitch type mark.

Also an announcement during pitching or batting may be output as an above mentioned sound effect.

In the above embodiment, the pitching zone where the pitcher can pitch is in a 5×5 matrix, where nine sub-zones at the center side are the strike zone, but the number of sub-zones to be created or the number of strike zones may be changed, for example, when the pitching of a strike is classified into four courses: "low and outside", "high and outside", "low and inside" and "high and inside". The above mentioned pitching zone may be parted into 4×4, where 4 sub-zones at the center side is the strike zone.

According to the present invention where a two-dimensional coordinate is set in a predetermined area on the display screen of the monitor, and the pitching course is displayed on this coordinate, more detailed pitching course data than a conventional display format can be provided to the player. As a result, amusement, in terms of the analysis of the pitching result, can be improved compared with a conventional baseball game.

The predetermined area where the two-dimensional coordinate is set is parted in a matrix by parting lines and is displayed, for example, so a game player can know a specific pitching course, such as "in course", "out of course", "high" and "low" of the pitch at first sight.

In the above mentioned predetermined area, the strike zone at the center side and the ball zone at a peripheral side thereof are displayed by a different display format, so the game player can clearly distinguish a strike from a ball.

Also, the pitching result includes the pitch type data, and the present invention further comprises the pitch type mark storage means for storing the pitch type marks corresponding to the pitch type data in advance, and a step of reading the pitch type mark corresponding to the pitch type from the pitch type mark storage means and displaying the mark on the monitor as a mark, so the data corresponding to the pitch type data and the pitching course data is obtained and the game player can know the pitch type of a ball and the course of the ball.

The present invention further comprises a step of storing the moving locus data of the pitched ball and a step of regenerating the ball during pitching on the monitor before or after the mark is displayed on the monitor, so the above mentioned amusement can be further improved.

The present invention further comprises pitcher storage means for storing a plurality of pitchers in advance, a step of classifying and storing each pitch for each pitcher that pitched a ball, and a step of regenerating a ball when each pitcher is pitching on the monitor, so the above mentioned amusement can be further improved, just like above.

Also the present invention further comprises hit result storage means for storing the hit result of a pitch for each pitch, a step of classifying and storing each pitch in the hit result storage means for each hit result, and a step of regenerating a ball during pitching in each hit result on the monitor, so the above mentioned amusement can be further improved.

Also the present invention further comprises a step of outputting a sound effect according to the pitch type when a ball during pitching is regenerated, so the feeling of a live game can be created.

Also the present invention further comprises a step of outputting a sound effect corresponding to the hit result when the ball is regenerated, so a feeling of a live game can be created, just like above.

This application is based on Japanese application serial no. 2000-113933 filed in Japan on Apr. 14, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A readable recording medium, having pitch type mark storage means for storing a pitch type mark, where a play result display method program for a video game is recorded, said play result display method program comprising:

storing a pitching result of a pitch executed based on an instruction to a pitcher game character that executes a pitching action displayed on a monitor for each pitch, the pitching result including pitch type data;

setting a two-dimensional coordinate for displaying a pitching course in a predetermined area on a display screen of said monitor;

converting a pitching course data of each pitch to a corresponding converted position data on said coordinate based on a read pitching result;

displaying a mark on the converted position on said monitor;

storing a pitch type mark corresponding to the pitch type in said pitch type mark storage means;

reading the pitch type mark corresponding to the pitch type from the pitch type mark storage means;

conveying the pitch type mark to said monitor as said mark;

storing moving locus data of a pitched ball;

displaying a screen showing pitching results in a table on said monitor;

allowing a game player to select a particular pitched ball from the table displayed on said monitor; and regenerating the particular pitched ball selected in said step of allowing, shown as moving along the moving locus stored in the step of storing during pitching on the monitor before or after displaying said mark on said monitor.

2. The readable recording medium according to claim 1, wherein said readable recording medium further comprises pitcher storage means for storing a plurality of pitchers in advance, and said play result display method further comprising the steps of:

classifying and storing each pitch for each pitcher that pitched a ball, and regenerating a ball on the monitor when each pitcher is pitching.

3. The readable recording medium according to claim 1, wherein said readable recording medium further comprises hit result storage means for storing a batting result of a pitch for each pitch, and said play result display method further comprising the steps of:

classifying and storing each pitch in the hit result storage means for each hit result; and regenerating a ball during pitching in each hit result on the monitor.

4. The readable recording medium according to claim 1, further comprising a step of outputting a sound effect according to the pitch type when a ball during pitching is regenerated.

5. The readable recording medium according to claim 1, further comprising a step of outputting a sound effect corresponding to the hit result when a ball is regenerated.

6. A readable recording medium, having pitch type mark storage means for storing a pitch type mark, for recording a play result display method program for a video game, said play result display method program comprising:

storing a pitching result of a pitch executed based on an instruction to a pitcher game character that executes a pitching action displayed on a monitor for each pitch;

setting a two-dimensional coordinate for displaying a pitching course in a predetermined area on a display screen of said monitor;

converting a pitching course data of each pitch to a corresponding converted position data on said coordinate based on a read pitching result, said pitching result including pitch type data;

storing a pitch type mark corresponding to the pitch type data in said pitch type mark storage means;

reading the pitch type mark corresponding to the pitch type from the pitch type mark storage means;

conveying the pitch type mark to said monitor as said mark;

displaying said mark on the converted position on said monitor;

storing moving locus data of a pitched ball;

displaying a screen showing pitching results in a table on said monitor;

allowing a game player to select a particular pitched ball from the table displayed on said monitor; and regenerating the particular pitched ball selected in said step of allowing, shown as moving along the moving locus stored in the step of storing moving locus data on the monitor before or after displaying said mark on said monitor.

7. A readable recording medium, having pitch type mark storage means for storing a pitch type mark, for recording a play result display method program for a video game, said play result display method program comprising:

storing a pitching result of a pitch executed based on an instruction to a pitcher game character that executes a pitching action displayed on a monitor for each pitch;

setting a two-dimensional coordinate for displaying a pitching course in a predetermined area on a display screen of said monitor;

converting a pitching course data of each pitch to a corresponding converted position data on said coordinate based on a read pitching result, said pitching result including pitch type data;

storing a pitch type mark corresponding to the pitch type data in said pitch type mark storage means;

reading the pitch type mark corresponding to the pitch type from the pitch type mark storage means;

conveying the pitch type mark to said monitor as said mark;

storing moving locus data of a pitched ball;

displaying a screen showing pitching results in a table on said monitor;

allowing a game player to select a particular pitched ball from the table displayed on said monitor;

regenerating the particular pitched ball selected in said step of allowing having been thrown during pitching according to the stored moving locus of said pitched ball on the monitor; and displaying said mark corresponding to the pitch for which regeneration has ended as semitransparent on the converted position on said monitor, and displaying the pitched ball moving along the stored moving locus after displaying said mark on said monitor, said regenerated pitched ball being displayed as opaque.

* * * * *